N/A

(12) United States Patent
Noh et al.

(10) Patent No.: US 8,542,647 B2
(45) Date of Patent: Sep. 24, 2013

(54) METHOD AND APPARATUS FOR TRANSMITTING SOUNDING REFERENCE SIGNAL IN RADIO COMMUNICATION SYSTEM

(75) Inventors: Min Seok Noh, Anyang-si (KR); Sung Ho Moon, Anyang-si (KR); Jae Hoon Chung, Anyang-si (KR); Seung Hee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 13/320,707

(22) PCT Filed: May 17, 2010

(86) PCT No.: PCT/KR2010/003101
§ 371 (c)(1),
(2), (4) Date: Nov. 15, 2011

(87) PCT Pub. No.: WO2010/131931
PCT Pub. Date: Nov. 18, 2010

(65) Prior Publication Data
US 2012/0069812 A1    Mar. 22, 2012

Related U.S. Application Data

(60) Provisional application No. 61/178,818, filed on May 15, 2009, provisional application No. 61/316,820, filed on Mar. 23, 2010, provisional application No. 61/321,146, filed on Apr. 6, 2010.

(30) Foreign Application Priority Data

May 14, 2010    (KR) .................. 10-2010-0045450

(51) Int. Cl.
*H04W 72/04*    (2009.01)
(52) U.S. Cl.
USPC ............................................ 370/329; 370/236
(58) Field of Classification Search
USPC .................................................. 370/329, 236
See application file for complete search history.

(56) References Cited

U.S. PATENT DOCUMENTS

| | | | |
|---|---|---|---|
| 2006/0035643 A1 | 2/2006 | Vook et al. | |
| 2008/0247391 A1 | 10/2008 | Choi et al. | |
| 2008/0298497 A1* | 12/2008 | Cho et al. | 375/295 |
| 2009/0077444 A1 | 3/2009 | Qi et al. | |
| 2009/0181687 A1* | 7/2009 | Tiirola et al. | 455/450 |
| 2009/0238241 A1* | 9/2009 | Hooli et al. | 375/133 |
| 2009/0290514 A1* | 11/2009 | Muharemovic et al. | 370/256 |
| 2010/0111107 A1* | 5/2010 | Han et al. | 370/472 |

FOREIGN PATENT DOCUMENTS

KR    10-2006-0096018 A    9/2006

* cited by examiner

*Primary Examiner* — Brian D Nguyen
(74) *Attorney, Agent, or Firm* — Birch, Stewart, Kolasch & Birch, LLP

(57) ABSTRACT

Disclosed is a method for transmitting a sounding reference signal from a terminal to a base station in a radio communication system. More specifically, the method comprises the steps of: receiving downlink control information from a base station; checking a flag bit included in said downlink control information; checking an interpretation bit is included in said downlink control information, when said flag bit indicates an uplink; and transmitting an additional sounding reference signal and/or an uplink common channel based on said interpretation bit.

14 Claims, 8 Drawing Sheets

FIG. 2
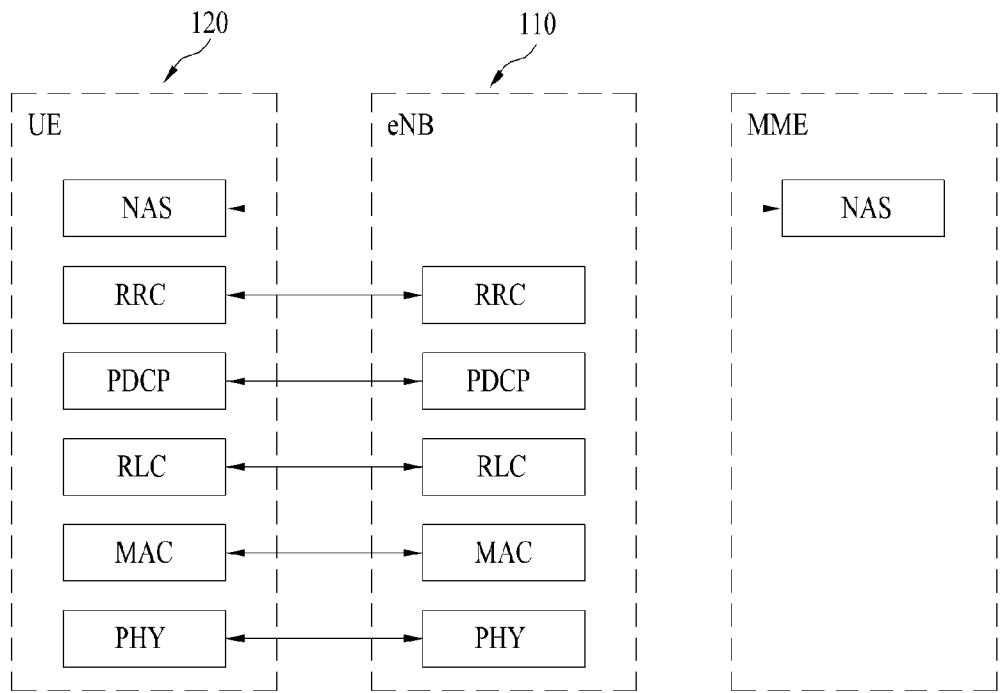
(a) CONTROL-PLANE PROTOCOL STACK
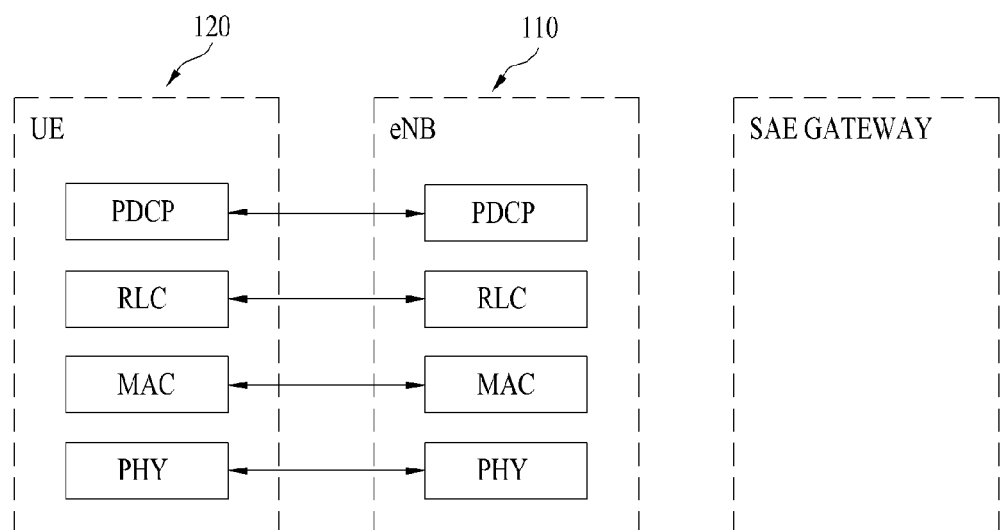
(b) USER-PLANE PROTOCOL STACK

METHOD AND APPARATUS FOR TRANSMITTING SOUNDING REFERENCE SIGNAL IN RADIO COMMUNICATION SYSTEM

This application is the National Phase of PCT/KR2010/003101 filed on May 17, 2010, which claims priority under 35 U.S.C. 119(e) to U.S. Provisional Application Nos. 61/178,818 filed on May 15, 2009, 61/316,820 filed on Mar. 23, 2010, 61/321,146 filed on Apr. 6, 2010 and under U.S.C. 119(a) to Patent Application No. 10-2010-0045450 filed in the Republic of Korea on May 14, 2010, all of which are hereby expressly incorporated by reference into the present application.

TECHNICAL FIELD

The present invention relates to a radio communication system, and more particularly, to a method and apparatus for transmitting sounding reference signals from a user equipment to a base station in a radio communication system.

BACKGROUND ART

As an example of a mobile communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz. The LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

DISCLOSURE

Technical Problem

An object of the present invention is to provide a method and apparatus for transmitting a plurality of sounding reference signals from a user equipment to a base station in a radio communication system.

The technical problems solved by the present invention are not limited to the above technical problems and those skilled in the art may understand other technical problems from the following description.

Technical Solution

The object of the present invention can be achieved by providing a method for transmitting sounding reference signals by a user equipment in a radio communication system, including receiving downlink control information from a base station, checking a flag bit included in the downlink control information, checking an interpretation bit included in the downlink control information if the flag bit indicates uplink, and performing at least one of transmission of an additional sounding reference signal or transmission of an uplink shared channel based on the interpretation bit. The downlink control information may be a format 0 or format 1a.

The method may further include performing reception of a downlink shared channel if the flag bit indicates downlink. The size of the interpretation bit may be 1 bit or 2 bits. The transmission of the uplink shared channel and the reception of the downlink shared channel may be performed via a single antenna.

In another aspect of the present invention, there is provided a method for transmitting sounding reference signals by a user equipment in a radio communication system, including receiving downlink control information defined in a legacy system along with downlink control information for uplink multiple input multiple output (MIMO) transmission from a base station, performing transmission of an uplink shared channel in an uplink MIMO mode, checking a flag bit included in the downlink control information defined in the legacy system, checking an interpretation bit included in the downlink control information defined in the legacy system if the flag bit indicates uplink, and performing transmission of an additional sounding reference signal based on the interpretation bit. The method may further include performing reception of a downlink shared channel using a single antenna if the flag bit indicates downlink.

In another aspect of the present invention, there is provided a user equipment in a radio communication system, including a reception module configured to receive downlink control information from a base station, a processor configured to check a flag bit included in the downlink control information and to check an interpretation bit included in the downlink control information if the flag bit indicates uplink, and a transmission module configured to perform at least one of transmission of an additional sounding reference signal or transmission of an uplink shared channel based on the interpretation bit.

In another aspect of the present invention, there is provided a user equipment in a radio communication system, including a reception module configured to receive downlink control information defined in a legacy system along with downlink control information for uplink multiple input multiple output (MIMO) transmission from a base station, a transmission module configured to perform transmission of an uplink shared channel in an uplink MIMO mode, and a processor configured to check a flag bit included in the downlink control information defined in the legacy system and to check an interpretation bit included in the downlink control information defined in the legacy system if the flag bit indicates uplink, wherein the transmission module performs transmission of an additional sounding reference signal based on the interpretation bit.

Advantageous Effects

According to the embodiments of the present invention, it is possible to efficiently transmit sounding reference signals in a radio communication system.

The effects of the present invention are not limited to the above-described effects and other effects which are not described herein will become apparent to those skilled in the art from the following description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

Figure 1:
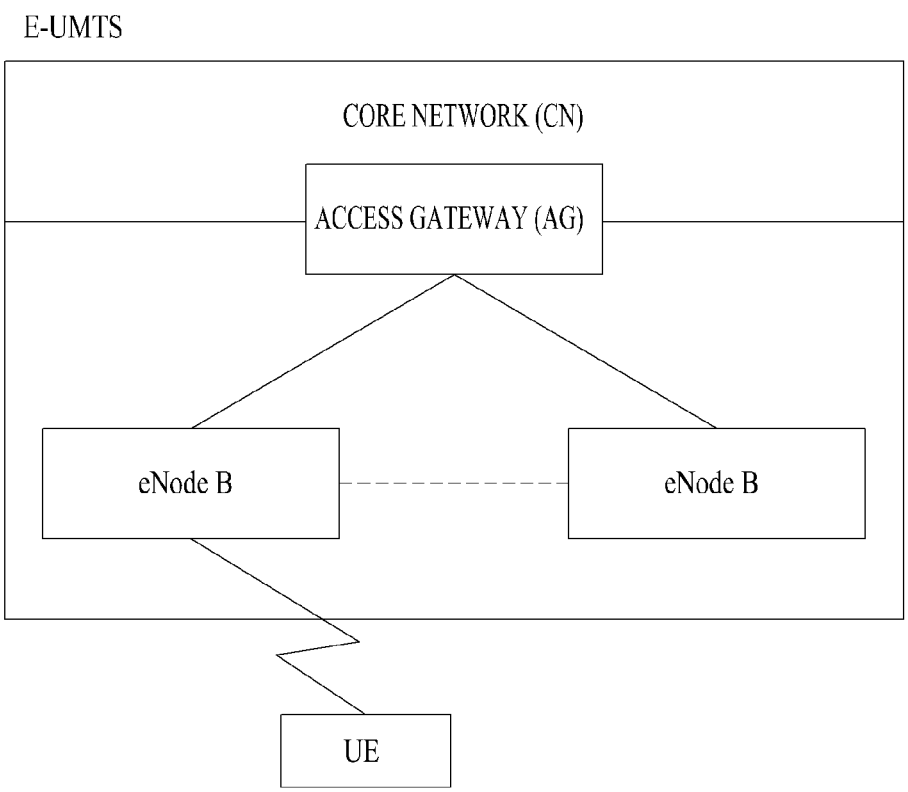
FIG. 1 is a diagram showing a network structure of an Evolved Universal Mobile Telecommunications System (E-UMTS) as an example of a mobile communication system.

The configuration, operation and other features of the present invention will be understood by the embodiments of the present invention described with reference to the accompanying drawings. The following embodiments are examples of applying the technical features of the present invention to $3^{rd}$ Generation Partnership Project (3GPP) system.

Hereinafter, a system in which a system band uses a single frequency block is referred to as a legacy system or a narrow-band system. A system in which a system band includes a plurality of frequency blocks and at least one frequency blocks are used as a system block of a legacy system is referred to as an evolved system or a wideband system. The frequency block used as the legacy system block has the same size as the system block and the legacy system. The sizes of the remaining frequency blocks are not specially limited. However, in order to simplify a system, the size of the remaining frequency blocks may be determined based on the size of the system block of the legacy system. For example, a 3GPP LTE system and a 3GPP LTE-A system are evolved from a legacy system.

Based on the above definition, in the present specification, a 3GPP LTE system is called an LTE system or a legacy system. A user equipment (UE) which supports an LTE system is called an LTE UE or a legacy UE. A 3GPP LTE-A system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, reconfiguration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
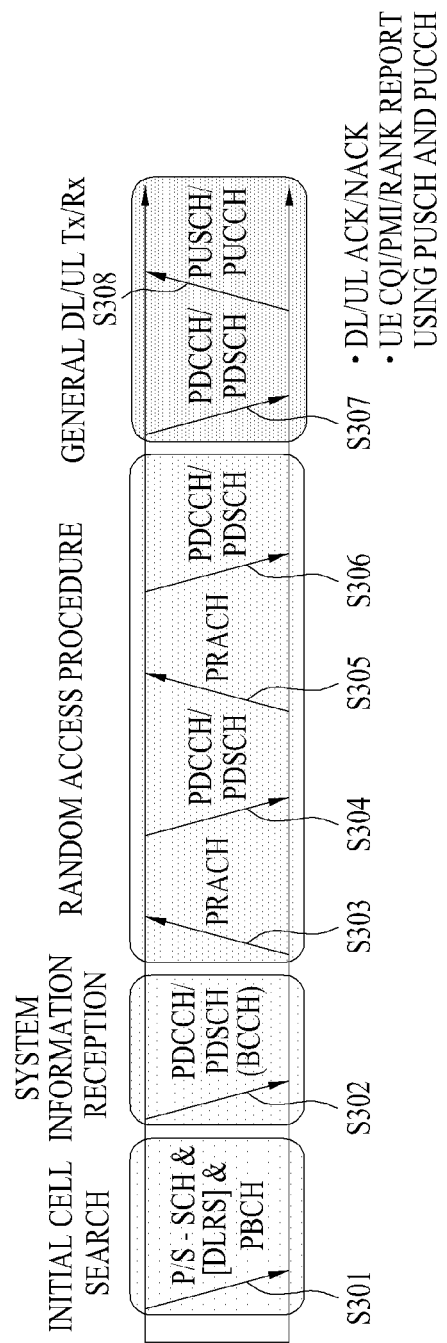
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
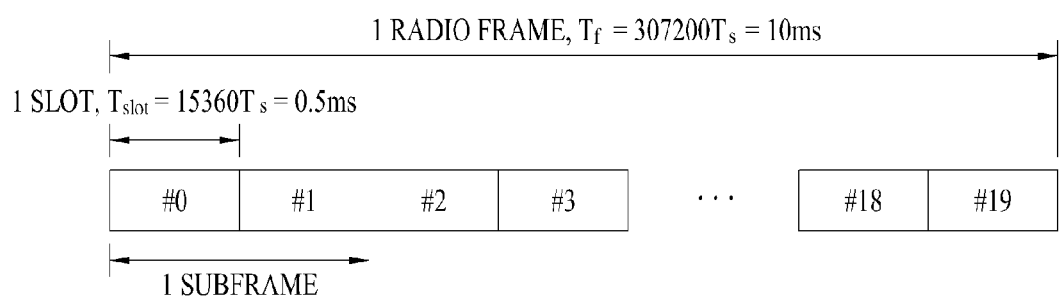
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms (327200·$T_s$) and includes 10 subframes with the same size. Each of the subframes has a length of 1 ms and includes two slots. Each of the slots has a length of 0.5 ms (15360·$T_s$). $T_s$, denotes a sampling time, and is represented by $T_s$=1/(15 kHz×2048)=3.2552×10$^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
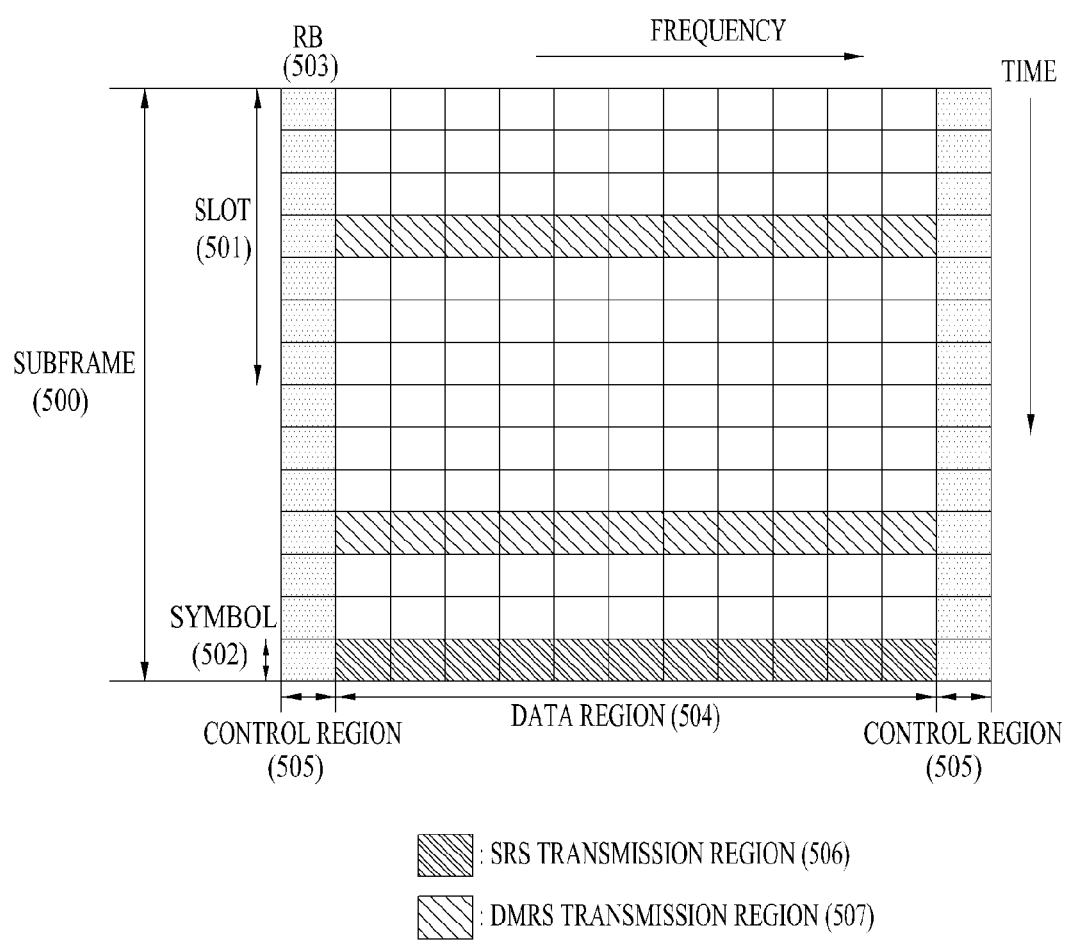
FIG. 5 is a diagram showing the structure of an uplink subframe in an LTE system.

FIG. 5 is a diagram showing the structure of an uplink subframe in an LTE system.

Referring to FIG. 5, a subframe 500 having a length of 1 ms, which is a basic unit of LTE uplink transmission, includes two slots 501 each having a length of 0.5 ms. In case of normal cyclic prefix (CP), each slot includes seven symbols 502 and one symbol corresponds to one SC-FDMA symbol. An RB 503 is a resource allocation unit corresponding to 12 subcarriers in a frequency domain and one slot in a time domain. The structure of the uplink subframe of the LTE is roughly divided into a data region 504 and a control region 505. The data region refers to a series of communication resources used to transmit data such as voice or packets to each UE and corresponds to resources excluding resources belonging to the control region in a subframe. The control region refers to a series of communication resources used to transmit a downlink channel quality report from each UE, reception ACK/NACK for a downlink signal, an uplink scheduling request, etc.

As shown in FIG. 5, a region 506 for transmitting a sounding reference signal (SRS) within one subframe is a part including SC-FDMA symbols located at the very last of a time axis and the SRS is transmitted via a data transmission band on a frequency axis. SRSs of several UEs transmitted using the last SC-FDMA symbols of the same subframe may be distinguished according to frequency locations.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8} \qquad \text{Equation 1}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 2.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{Equation 2}$$

where, $k_0$ denotes a frequency domain start point of an SRS and is defined by Equation 3.

$$k_0 = k'_0 + \sum_{b=0}^{B_{SRS}} 2M_{sc,b}^{RS} n_b \qquad \text{Equation 3}$$

where, $n_b$ denotes a frequency location index. $k'_0$ a general uplink subframe is defined by Equation 4 and $k'_0$ for an uplink pilot time is defined by Equation 5.

$$k'_0 = (\lfloor N_{RB}^{UL}/2 \rfloor - m_{SRS,0}/2)N_{SC}^{RB} + k_{TC} \qquad \text{Equation 4}$$

$$k'_0 = \begin{cases} (N_{RB}^{UL} - m_{SRS,0}^{max})N_{sc}^{RB} + & \text{if } ((n_f \bmod 2) \times \\ k_{TC} & (2 - N_{SP}) + n_{hf}) \bmod 2 = 0 \\ k_{TC} & \text{otherwise} \end{cases} \qquad \text{Equation 5}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 6.

$$M_{sc,b}^{RS} = m_{SRS,b} N_{sc}^{RB}/2 \qquad \text{Equation 6}$$

In Equation 6, $m_{SRS,b}$ is a value signaled from an eNB according to an uplink bandwidth $N_{RB}^{UL}$ as shown in Tables 1 to 4.

In order to acquire $m_{SRS,b}$, a cell-specific parameter $C_{SRS}$ having an integer value of 0 to 7 and a UE-specific parameter $B_{SRS}$ having an integer value of 0 to 3 are necessary. The values of $C_{SRS}$ and $B_{SRS}$ are provided by a higher layer.

TABLE 1

$b_{hop} = 0, 1, 2, 3$ and $6 \leq N_{RB}^{UL} \leq 40$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$ and $40 < N_{RB}^{UL} \leq 60$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$ and $60 < N_{RB}^{UL} \leq 80$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |

TABLE 3-continued $b_{hop} = 0, 1, 2, 3$ and $60 < N_{RB}^{UL} \leq 80$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$ and $80 < N_{RB}^{UL} \leq 110$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 7. Here, $n_{RRC}$ is a parameter received from a higher layer.

$$n_b = \lfloor 4n_{RRC}/m_{SRS,b} \rfloor \bmod N_b \qquad \text{Equation 7}$$

Meanwhile, if frequency hopping of the SRS is activated, that is, $b_{hop} < B_{SRS}$, a frequency location index $n_b$ is defined by Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \qquad \text{Equation 8}$$

$$F_b(n_{SRS}) = \begin{cases} (N_b/2)\left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \qquad \text{Equation 9}$$

where, $n_{SRS}$ is a parameter used to calculate the number of times of transmitting the SRS and is defined by Equation 10.

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms SRS periodicity of TDD frame structure} \\ \lfloor (n_f \times 10 + \lfloor n_s/2 \rfloor)/T_{SRS} \rfloor, & \text{otherwise} \end{cases} \qquad \text{Equation 10}$$

In Equation 10, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Tables 5 and 6 according to FDD and TDD. In particular, Table 5 shows the SRS configuration index for FDD and Table 6 shows the SRS configuration index for TDD.

TABLE 5

| SRS Configuration Index $I_{SRS}$ | SRS Periodicity $T_{SRS}$ (ms) | Subframe SRS Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

As described above, the UE receives parameters from the eNB through RRC signaling and transmits a periodic SRS. The eNB instructs the UE to transmit an additional SRS and the UE transmits the additional SRS to the eNB according to the instruction.

A method of signaling an instruction to transmit an additional SRS and the format of downlink control information for defining the additional SRS need to be defined and the operation of the UE corresponding thereto also needs to be defined.

First, the method of signaling the instruction to transmit the additional SRS will be described.

First, as a method of utilizing the existing DCI format, signaling of an uplink grant PDCCH with a DCI format of 0 or a PDCCH for transmit power control through a DCI format 3/3A may be considered. In this case, an indicator bit indicating transmission of the additional SRS may be added so as to instruct the UE to transmit an SRS conditionally generated when an event occurs.

Meanwhile, in consideration that only the LTE-A system supports transmission of the additional SRS, the instruction to transmit the additional SRS is preferably signaled using a DCI format specific to the LTE-A system. In the DCI format specific to the LTE-A system proposed by the present invention, an interpretation bit for using a DCI format for uplink MIMO supported by the LTE-A system for other purposes according to interpretation may be added. Using the DCI format for other purposes may indicate that the DCI format is used for an uplink MIMO transmission mode or is used to transmit the additional SRS described in the present invention.

In addition, the interpretation bit may be included in the DCI format for uplink MIMO, a DCI format 0 or a DCI format 1a.

If the size of the interpretation bit is 1 bit, the DCI format may indicate only transmission of uplink MIMO data or simultaneous transmission of uplink MIMO data and an SRS which is transmitted only once or an SRS which is transmitted multiple times as an additional SRS according to interpretation of 1 bit.

Alternatively, the DCI format may indicate activation or inactivation of an SRS which is transmitted only once as an additional SRS according to interpretation of 1 bit.

Further, if the size of the interpretation bit is 2 bits, the interpretation bit may indicate whether a periodic SRS is reconfigured and an additional SRS is activated. For example, the interpretation bit 00 may indicate only transmission of uplink MIMO data, the interpretation bit 01 may indicate simultaneous transmission of uplink MIMO data and an SRS which is transmitted only once, and the interpretation bit 10 may indicate transmission of an SRS which is transmitted only once.

In addition, the interpretation bit 11 may indicate reconfiguration of an SRS of the existing LTE system or instructions to transmit an additional SRS except for an SRS which is transmitted only once. In this case, the DCI format may include parameters of the periodic SRS in the existing LTE system, for example, an SRS transmission bandwidth, a frequency start location, transmissionComb, a cyclic shift value, a subframe offset, a transmission periodicity, a hopping parameter, etc. and may include information indicating whether the periodic SRS and the additional SRS are transmitted via the same subframe or an uplink component carrier indicator for transmitting the additional SRS.

Hereinafter, the operation of the UE when receiving the newly defined DCI format indicating transmission of the additional SRS will be described. In particular, it is assumed that the newly defined DCI format indicates that the DCI format for uplink MIMI transmission is used as described above and the interpretation bit is included in a DCI format 0 or DCI format 1a.

1) In the LTE-A system, if the UE detects a DCI format 0 or DCI format 1 as one PDCCH through blind decoding, the UE determines whether the detected DCI is for uplink fallback transmission or downlink fallback transmission through a UL/DL flag bit of a DCI format 0 or DCI format 1. If the UL/DL flag bit is set to uplink, it may be determined whether the UE transmits a PUSCH or an additional SRS (or simultaneously transmits the PUCCH and the additional SRS) as uplink fallback through an interpretation bit for the additional SRS included in a DCI format 0/1a or unused state information in a specific field of a DCI format 0/1a.

Figure 6:
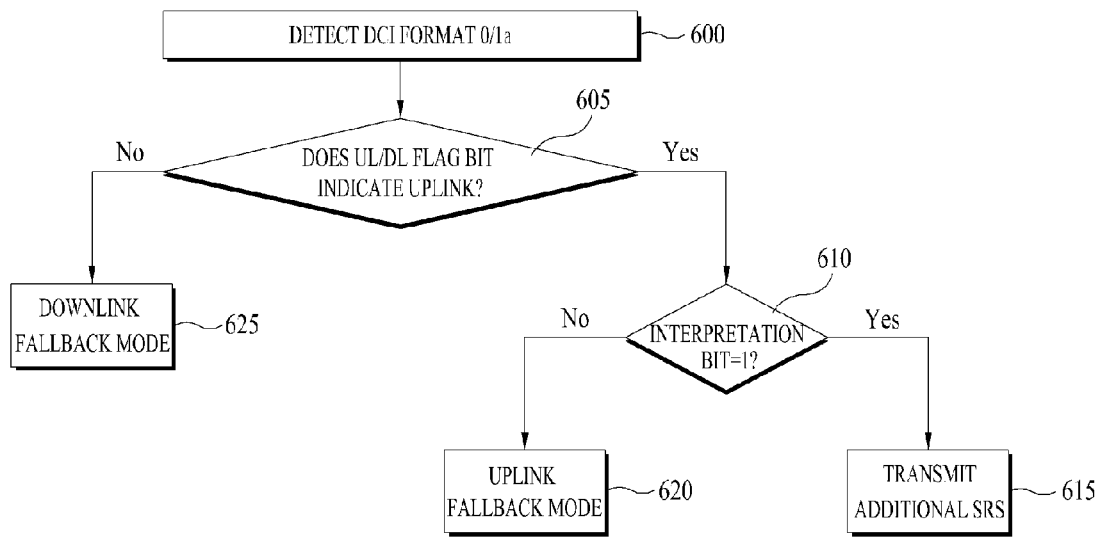
FIG. 6 is a flowchart illustrating an operation of a UE for determining whether or not an additional sounding reference signal is transmitted according to an embodiment of the present invention.

FIG. 6 is a flowchart illustrating an operation of a UE for determining whether or not an additional SRS is transmitted according to an embodiment of the present invention.

Referring to FIG. 6, the UE detects one PDCCH of a DCI format 0 or DCI format 1a in step 600 and checks a UL/DL flag bit of the DCI format 0 or DCI format 1 in step 605. If the UL/DL flag bit is set to uplink (for example, is set to 1), the UE checks an interpretation bit included in the DCI format 0 or DCI format 1a or unused state information in a specific field in step 610.

Subsequently, if the interpretation bit is set to 1 (or 0) in step 610, the UE transmits the additional SRS (along with a PUSCH) to an eNB in step 615. However, if the interpretation bit is set to 0 (or 1), the UE transmits a PUSCH via a single antenna as an uplink fallback mode.

Meanwhile, if the UL/DL flag bit is set to downlink (for example, is set to 0) in step 605, the UE receives a PDSCH via a single antenna as a downlink fallback mode.

2) Next, in the LTE-A system, if the UE detects two PDCCHs, that is, a newly defined DCI format for uplink MIMO transmission or a DCI format 0 or DCI format 1a defined in the LTE system, it may be difficult for the UE to determine whether uplink transmission based on grant for uplink MIMO transmission is performed, a PUCSH is transmitted in an uplink single-antenna mode according to the DCI format 0 or DCI format 1a as an uplink fallback mode or a PDSCH is received in a downlink single-antenna mode according to the DCI format 0 or DCI format 1a as a downlink fallback mode.

In order to solve such a problem, a method of prioritizing a newly defined DCI format for uplink MIMO transmission may be considered. That is, PUSCH transmission of an uplink MIMO mode is performed and, if the DL/UL flag bit of the DCI format 0 or DCI format 1 indicates uplink, it is implicitly interpreted that the additional SRS is transmitted or the PUSCH and the additional SRS are simultaneously transmitted. By first reading the DL/UL flag bit of information included in the DCI format 0 or DCI format 1a, it is possible to transmit the additional SRS without the interpretation bit. In contrast, if the DL/UL flag bit of the DCI format 0 or DCI format 1a indicates downlink, the UE performs PUSCH transmission of the uplink MIMO mode and receives the PDSCH via a single antenna as a downlink fallback mode.

As another solution based on the method of prioritizing the newly defined DCI format for uplink MIMO transmission, PUSCH transmission of an uplink MIMO mode is performed and, if the DL/UL flag bit of the DCI format 0 or DCI format 1 indicates uplink, the interpretation bit included in the DCI format 0 or DCI format 1a or the unused state information in a specific field is checked. By checking the interpretation bit, the UE may determine whether the additional SRS is transmitted (or the PUSCH of the uplink MIMO mode and the additional SRS are simultaneously transmitted). Similarly, if the DL/UL flag bit of the DCI format 0 or DCI format 1a indicates downlink, the UE performs PUSCH transmission of the uplink MIMO mode and receives the PDSCH via a single antenna as a downlink fallback mode.

Figure 7:
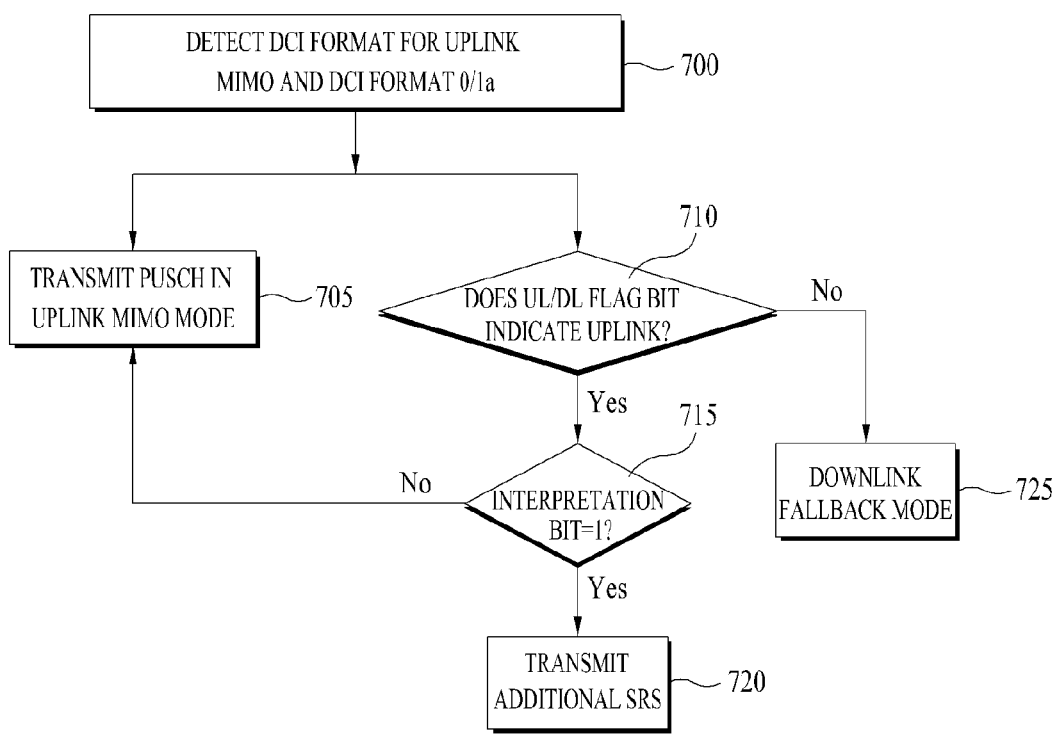
FIG. 7 is a flowchart illustrating an operation of a UE for determining whether or not an additional sounding reference signal is transmitted according to another embodiment of the present invention.

FIG. 7 is a flowchart illustrating an operation of a UE for determining whether or not an additional SRS is transmitted according to another embodiment of the present invention.

Referring to FIG. 7, the UE detects two PDCCHs of a DCI format 0 or DCI format 1a and a newly defined DCI format for uplink MIMO transmission in step 700 and prioritizes the newly defined DCI format for uplink MIMO transmission to perform PUSCH transmission of the uplink MIMO mode in step 705.

Subsequently, the UE checks the UL/DL flag bit of the DCI format 0 or DCI format 1a in step 710. If the UL/DL flag bit is set to uplink (for example, is set to 1), the UE checks the interpretation bit included in the DCI format or DCI format 1a or unused state information in a specific field again in step 715.

Subsequently, if the interpretation bit is set to 1 (or 0) in step 715, the UE transmits the additional SRS (along with the PUSCH) to the eNB in step 720. However, if the interpretation bit is set to 0 (or 1), the UE returns to step 705 and performs PUSCH transmission of the uplink MIMO mode.

In contrast, if the UL/DL flag bit is set to downlink (for example, is set to 0) in step 710, the UE receives a PDSCH via a single antenna as a downlink fallback mode in step 725.

3) Finally, in the LTE-A system, if the UE detects two PDCCHs, that is, the DCI format 0 or DCI format 1a defined in the LTE system and another DCI format defined in the LTE system, it may be difficult for the UE to determine whether downlink reception based on grant for downlink MIMO reception is performed, a PUCSH is transmitted in an uplink single-antenna mode according to the DCI format 0 or DCI format 1a as an uplink fallback mode or a PDSCH is received in a downlink single-antenna mode according to the DCI format 0 or DCI format 1a as a downlink fallback mode.

In order to solve such a problem, a method of prioritizing another DCI format defined in the LTE system may be considered. That is, PUSCH reception of a downlink MIMO mode is performed and, if the DL/UL flag bit of the DCI format 0 or DCI format 1 indicates downlink, it is implicitly interpreted that the additional SRS is transmitted. In contrast, if the DL/UL flag bit of the DCI format 0 or DCI format 1a indicates uplink, the UE performs PUSCH transmission of the downlink MIMO mode and transmits the PUSCH via a single antenna as an uplink fallback mode.

Meanwhile, if the UE transmits the additional SRS using the above-described methods, the UE may use cell-specific parameters for the periodic SRS without change or the eNB may separately signal cell-specific parameters for the additional SRS through an RRC layer. In order to reduce overhead of a PDCCH for signaling UE-specific parameters, a method of configuring at least one of the transmissionComb parameter, the start resource block location, the transmission duration, the transmission periodicity, the subframe offset information, the transmission bandwidth, the frequency hopping parameter and the cyclic shift value through the RRC layer may be considered.

Figure 8:
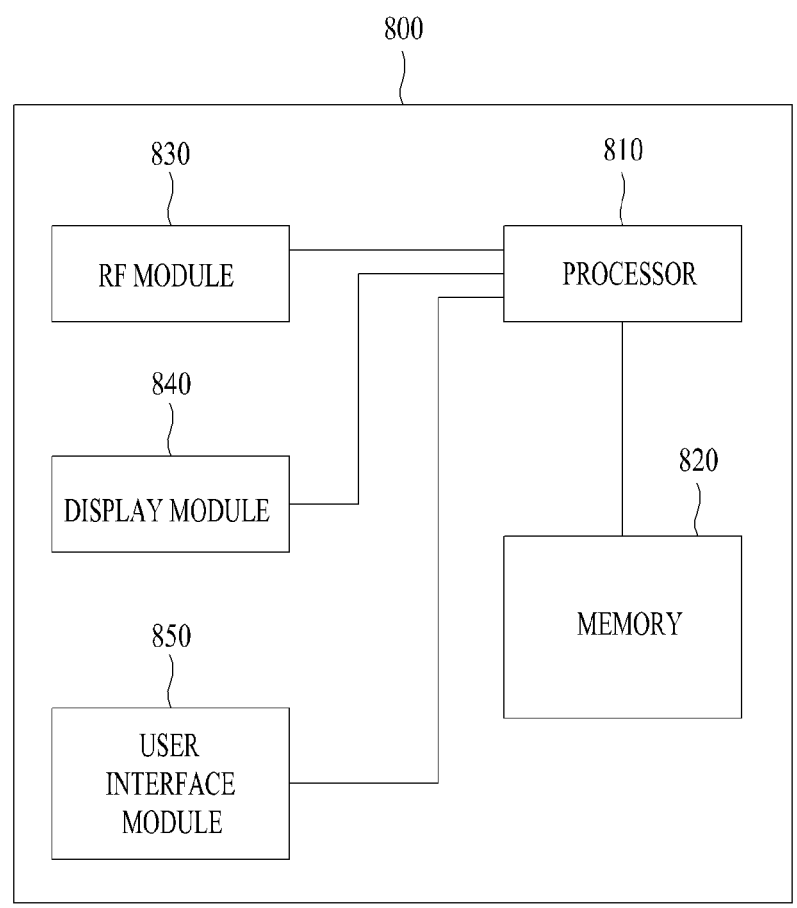
FIG. 8 is a block diagram showing a transmitter or receiver according to an embodiment of the present invention.

FIG. 8 is a block diagram showing a transmitter or receiver according to an embodiment of the present invention. The transmitter or receiver may be a part of an eNB or a UE.

Referring to FIG. 8, a transmitter/receiver 800 includes a processor 810, a memory 820, a Radio Frequency (RF) module 830, a display module 840 and a user interface module 850.

The transmitter/receiver 800 is shown for convenience of description and some modules thereof may be omitted. In addition, the transmitter/receiver 800 may further include necessary modules. In addition, some modules of the transmitter/receiver 800 may be subdivided. The processor 810 is configured to perform an operation of the embodiment of the present invention described with respect to the drawings.

More specifically, if the transmitter/receiver 800 is a portion of an eNB, the processor 810 may perform a function for generating a control signal and mapping the control signal to a control channel set within a plurality of frequency blocks. If the transmitter/receiver 800 is a portion of a UE, the processor 810 may confirm a control channel indicated thereto from a signal received through a plurality of frequency blocks and extract a control signal.

Thereafter, the processor 810 may perform a necessary operation based on the control signal. For a detailed description of the operation of the processor 810, reference may be made to the description associated with FIGS. 1 to 7.

The memory 820 is connected to the processor 810 so as to store an operating system, an application, program code, data and the like. The RF module 830 is connected to the processor 810 so as to perform a function for converting a baseband signal into a radio signal or converting a radio signal into a baseband signal. The RF module 830 performs analog conversion, amplification, filtering and frequency up-conversion or inverse processes thereof. The display module 840 is connected to the processor 810 so as to display a variety of information. As the display module 840, although not limited thereto, a known device such as a Liquid Crystal Display (LCD), a Light Emitting Diode (LED), or an Organic Light Emitting Diode (OLED) may be used. The user interface module 850 is connected to the processor 810 and may be configured by a combination of known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "User Equipment (UE)" may also be replaced with the term subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a radio communication system and, more particularly, to a method and apparatus for transmitting sounding reference signals in a radio communication system to which carrier aggregation is applied.

The invention claimed is:

1. A method for transmitting sounding reference signals by a user equipment in a radio communication system, comprising:
    receiving downlink control information from a base station;
    checking a flag bit included in the downlink control information;
    checking an interpretation bit included in the downlink control information if the flag bit indicates uplink; and
    performing at least one of transmission of an additional sounding reference signal or transmission of an uplink shared channel based on the interpretation bit.

2. The method according to claim 1, wherein the downlink control information is a format 0 or format 1a.

3. The method according to claim 1, further comprising performing reception of a downlink shared channel if the flag bit indicates downlink.

4. The method according to claim 1, wherein the size of the interpretation bit is 1 bit or 2 bits.

5. The method according to claim 1, wherein the transmission of the uplink shared channel and the reception of the downlink shared channel are performed via a single antenna.

6. A method for transmitting sounding reference signals by a user equipment in a radio communication system, comprising:
    receiving downlink control information defined in a legacy system along with downlink control information for uplink multiple input multiple output (MIMO) transmission from a base station;
    performing transmission of an uplink shared channel in an uplink MIMO mode;
    checking a flag bit included in the downlink control information defined in the legacy system;
    checking an interpretation bit included in the downlink control information defined in the legacy system if the flag bit indicates uplink; and
    performing transmission of an additional sounding reference signal based on the interpretation bit.

7. The method according to claim 6, further comprising performing reception of a downlink shared channel using a single antenna if the flag bit indicates downlink.

8. A user equipment in a radio communication system, comprising:
    a reception module configured to receive downlink control information from a base station;
    a processor configured to check a flag bit included in the downlink control information and to check an interpretation bit included in the downlink control information if the flag bit indicates uplink; and
    a transmission module configured to perform at least one of transmission of an additional sounding reference signal or transmission of an uplink shared channel based on the interpretation bit.

9. The user equipment according to claim 8, wherein the downlink control information is a format 0 or format 1a.

10. The user equipment according to claim 8, wherein the reception module performs reception of a downlink shared channel if the flag bit indicates downlink.

11. The user equipment according to claim 8, wherein the size of the interpretation bit is 1 bit or 2 bits.

12. The user equipment according to claim 8, wherein the transmission of the uplink shared channel and the reception of the downlink shared channel are performed via a single antenna.

13. A user equipment in a radio communication system, comprising:
    a reception module configured to receive downlink control information defined in a legacy system along with downlink control information for uplink multiple input multiple output (MIMO) transmission from a base station;
    a transmission module configured to perform transmission of an uplink shared channel in an uplink MIMO mode; and
    a processor configured to check a flag bit included in the downlink control information defined in the legacy system and to check an interpretation bit included in the downlink control information defined in the legacy system if the flag bit indicates uplink,
    wherein the transmission module performs transmission of an additional sounding reference signal based on the interpretation bit.

14. The user equipment according to claim 13, wherein the reception module performs reception of a downlink shared channel using a single antenna if the flag bit indicates downlink.

* * * * *